United States Patent [19]

Pevzner et al.

[11] 4,261,958
[45] Apr. 14, 1981

[54] PROCESS FOR THE PRODUCTION OF SODIUM ALUMINATE

[76] Inventors: Ilya Z. Pevzner, ulitsa Soklata Korzuna, 52, kv. 141; Vitaly Y. Tumarinson, ulitsa Basseinaya, 85, kv. 53; Nikolai I. Eremin, propsket Elizarova, 20, kv. 28; Dmitry E. Subochev, prospekt Veteranov, 99, kv. 141; Alexandr S. Ryzhkov, Tverskaya ulitsa, 12/15, kv. 30; Leonid S. Nisse, ulitsa Chekhova 3, kv. 31, all of Leningrad, U.S.S.R.

[21] Appl. No.: 895,521

[22] Filed: Apr. 11, 1978

Related U.S. Application Data

[63] Continuation-in-part of Ser. No. 807,338, Jun. 16, 1977, abandoned, Continuation of Ser. No. 615,074, Sep. 19, 1975, abandoned.

[51] Int. Cl.³ .......................... C01F 7/06; C01F 7/08; C01F 7/12
[52] U.S. Cl. ..................................... 423/121; 423/600; 423/DIG. 16; 23/293 A; 23/305 A; 23/313 FB
[58] Field of Search ............. 23/302 R, 305 A, 293 R, 23/313 FB, 293 A; 159/DIG. 3; 423/600, 415 P, 628, 121, DIG. 16; 34/10

[56] References Cited

U.S. PATENT DOCUMENTS

| | | | |
|---|---|---|---|
| 2,345,134 | 3/1944 | Lindsay et al. | 423/600 |
| 2,567,959 | 9/1951 | Munday | 23/313 FB |
| 2,981,600 | 4/1961 | Porter | 423/121 |
| 3,408,746 | 11/1968 | Reynolds et al. | 159/DIG. 3 |
| 3,748,103 | 7/1973 | Bean et al. | 23/313 FB |
| 3,849,233 | 11/1974 | Lykov et al. | 23/313 FB |
| 4,005,987 | 2/1977 | Jury | 23/313 FB |

FOREIGN PATENT DOCUMENTS 194790  3/1967  U.S.S.R. ................................. 423/600

Primary Examiner—Bradley Garris
Attorney, Agent, or Firm—Haseltine and Lake

[57] ABSTRACT

A process for the production of sodium aluminate comprising drying an aluminate solution containing from 45 to 350 g/l of caustic $Na_2O$ with a molecular ratio of caustic $Na_2O$ to $Al_2O_3$ from 1.1 to 1.8 in a fluidized bed of solid particles at 250°–400° C. of sodium aluminate using a gas heated to 750°–950° C. containing no carbon dioxide as a fluidizing medium and a heat carrier in an amount from 2000 to 25000 $nm^3$ per 1 $m^3$ of aluminate solution; feeding said aluminate, solution for drying by atomizing it at a velocity from 25 to 35 m/s thereby obtaining sodium aluminate in the form of pellets of a size from 0.5 to 8 mm with a bulk weight from 1.2 to 1.4 $t/m^3$ completely soluble in water and alkaline solutions, with a maximum content of hygroscopic moisture of 0.3% by weight and a maximum content of water of crystallization of 5% by weight. The process is simple as regards the manufacturing technique and equipment; it is characterized by stable operating conditions and high quality of the end product.

3 Claims, No Drawings

PROCESS FOR THE PRODUCTION OF SODIUM ALUMINATE

REFERENCE TO PARENT APPLICATIONS

This application is a continuation-in-part of application Ser. No. 807338 filed June 16, 1977 which in turn is a Continuation of Ser. No. 615,074 filed on Sept. 19, 1975, both now abandoned.

FIELD OF THE INVENTION

Sodium aluminate is widely used in paper making, in preparation of water resistant concrete mixes and as an antiseptic and coagulating additive for water treatment.

BACKGROUND OF THE INVENTION

Known in the art is a process for the production of sodium aluminate by crystallizing it from aluminate solutions with a concentration of caustic $Na_2O$ from 500 to 550 g/l and molecular ratio of caustic $Na_2O$ to $Al_2O_3$ from 20 to 30.

The production of aluminate solutions of the above concentration requires preliminary evaporation of the starting solutions.

The disadvantage of the above-described process consists in an intense corrosion of the equipment, which is due to the use of highly concentrated alkalis, as well as in high power consumption for the evaporation of solutions. Moreover, considerable technical difficulties are encountered in separating sodium aluminate from the mother liquor because of the high viscosity thereof. The end product contains up to 30% of mother liquor, and while washing the latter the crystalline product is partially dissolved.

It is known to produce sodium aluminate by drying an aluminate solution with a molecular ratio of caustic $Na_2O$ to $Al_2O_3$ of 1.1 in the form of a thin film applied to a metal surface at up to 200° C.

In order to prevent aluminum hydroxide precipitate from depositing from the aluminate solution during the drying, up to 5% by weight of organic stabilizers, such as gluconic, gallic, pyrogallic acids or salts thereof are preliminarily added to the aluminate solution (before feeding for drying). The above-mentioned stabilizers are expensive and not readily available products. In addition, the above-described process requires much heat for drying. The end product obtained as a lump layer should be then comminuted for packing, transportation and use. All the above-said makes the process uneconomical.

Known in the art is a process for isolating solids such as calcium chloride or magnesium sulphate from aqueous solutions thereof, the solids being obtained in the form of pellets. The process is carried out in an apparatus having a vertical fluidized bed chamber receiving an ascending flow of heated gas at 200°–370° C. for fluidization of finely dispersed solid particles. The apparatus has a discharge pipe arranged outside the fluidized bed chamber connecting this chamber to a chamber for atomization of the aqueous solution. Finely dispersed particles are recycled between the chambers of the apparatus. An aqueous solution of the solid is sprayed in the atomization chamber on finely dispersed particles heated in the fluidized bed chamber. Thus the solid is released from the solution on the hot surfaces of the solid particles, and water evaporates (that is drying of the solution occurs). The size of the resultant pellets of solid depends on the residence time (number of recycles) of solid particles in the apparatus. Heated gas is admitted to the chamber for atomization of the aqueous solution for transporting solid particles to the fluidized bed chamber. The coarsest particles in the form of pellets which entered the fluidized bed chamber descend to the bottom part of the chamber under gravity and are discharged therefrom. Fine solid particles are again fed to the chamber for atomization of the aqueous solution for repeated treatment.

Drying and pelletizing in the above-described process mainly occur in a flow of finely dispersed particles circulating at transport velocities. To obtain a desired pellet size, it is necessary to provide for repeated circulation of particles through the chamber for atomization of the solution thus increasing power consumption, complicating the equipment and manufacturing process. The need to develop transport velocities for the removal of solid particle from the atomization chamber results in increased dust losses.

Known in the art is a process for the production of a pelletized product, such as monoammonium phosphate or magnesium chloride from solutions or suspensions. In this process, a solution or suspension is atomized by a flow of heated gas at 600° to 1200° C. in the top part of a drying apparatus. The product in the form of pellets dried to between 65 and 95% in the hot gas flow is fed to a fluidized bed for afterdrying to residual moisture content of from 5 to 35% by weight with gas fed through a grate to the bottom part of the apparatus at a temperature below the melting point or decomposition temperature of the end product.

Drying solutions by the above-described method is uneconomical, and this method is only used for products having a low melting point or decomposition temperature. Moreover, the resultant end product has a high residual moisture content which considerably impairs its quality.

SUMMARY OF THE INVENTION

It is an object of the invention to simplify the manufacturing technique and equipment for the process for the production of sodium aluminate.

Another object of the invention is to provide a process enabling the lowering of power consumption.

Still another object of the invention is to provide a process enabling the preparation of high grade end product.

With these and other objects in view, the invention consists in drying an aluminate solution containing from 45 to 350 g/l of caustic $Na_2O$ with a molecular ratio of caustic $Na_2O$ to $Al_2O_3$ from 1.1 to 1.8 at 250°–400° C. in a fluidized bed of solid particles of sodium aluminate using a heated gas at 750°–950° C. containing no carbon dioxide as fluidizing medium and heat carrier in an amount from 2000 to 25000 $nm^3$ per 1 $m^3$ of aluminate solution; feeding said aluminate solution for drying by atomizing it at a velocity from 25 to 35 m/s, thereby obtaining sodium aluminate in the form of pellets of a size from 0.5 to 8 mm with a bulk weight from 1.2 to 1.4 $t/m^3$ which is completely soluble in water and alkaline solutions, with a maximum content of hygroscopic water of 0.3% by weight and maximum content of water of crystallization of 5% by weight.

The process according to the invention features simple manufacturing technique and equipment and stable operating conditions. The process makes possible the production of a high grade end product.

The process according to the invention permits the use of aluminate solutions obtained by dissolving aluminum hydroxide in an aqueous solution of sodium hydroxide. Moreover, the process according to the invention permits the use of aluminate solutions obtained by leaching bauxites or cakes resulting from sintering of bauxites with sodium and calcium carbonates at 1200°–1300° C., as starting products for the production of sodium aluminate.

The aluminate solution preferably has a concentration of caustic $Na_2O$ from 250 to 280 g/l with a molecular ratio of caustic $Na_2O$ to $Al_2O_3$ from 1.1 to 1.3. This provides for obtaining sodium aluminate in the form of a pelletized product with minimum dust losses from the apparatus thus making it possible to carry out the process without special dedusting equipment.

Prior to the drying, aluminate solutions with a concentration of caustic $Na_2O$ from 45 to 180 g/l are preferably dehydrated to a concentration of caustic $Na_2O$ from 250 to 350 g/l thereby obtaining the lowering of specific fuel consumption.

DETAILED DESCRIPTION OF THE INVENTION

The process of the production of sodium aluminate according to the invention is carried out in the following manner.

The process uses aluminate solutions obtained in alumina manufacture:

(1) by leaching bauxites or (2) by leaching cakes obtained as a result of sintering of bauxites with sodium and calcium carbonates at 1200°–1300° C., as well as solutions obtained by dissolving aluminum hydroxide in an aqueous solution of sodium hydroxide.

In case aluminate solutions are used which are obtained by leaching bauxites or cakes from the alumina manufacture, the concentration of such solutions should be within the range from 45 to 180 g/l of caustic $Na_2O$ with a molecular ratio of caustic $Na_2O$ to $Al_2O_3$ from 1.1 to 1.8. Prior to the drying the above-mentioned solutions may be dehydrated to a concentration of caustic $Na_2O$ from 250 to 350 g/l. Dehydration may be effected by vacuum cooling or evaporation in multiple-effect evaporators. Aluminate solutions with concentration of caustic $Na_2O$ from 250 to 350 g/l with a molecular ratio of caustic $Na_2O$ to $Al_2O_3$ from 1.1 to 1.8 may also be obtained directly in the course of leaching of bauxites and cakes.

A concentration of caustic $Na_2O$ of 45 g/l is characteristic of the weakest solutions obtained in alumina manufacture (wash liquors), and a concentration of caustic $Na_2O$ of 350 g/l is the limit concentration at which satisfactory operation of the evaporating system can still be achieved.

The above-mentioned aluminate solutions are fed to a fluidized bed apparatus, e.g. by means of a nozzle mounted in the top part of the apparatus. The spraying velocity is from 25 to 35 m/s which is provided by compressed air or mechanical means. The atomized solution is fed to the surface of solid particles of sodium aluminate forming the fluidized bed in the bottom part of the apparatus. The temperature of the product in the fluidized bed is maintained at from 250° to 400° C. At a temperature below 250° C., incrustation of the apparatus surface occurs and a crust is formed, whereas operation at temperatures above 400° C. is associated with an excessive heat consumption. Fluidization of the product (solid sodium aluminate particles) is ensured by feeding to the gas distribution grate of the apparatus a heated gas at 750° to 950° C. containing no carbon dioxide, such as air or other inert gas. Such gas is both heat carrier and fluidizing medium. The flow rate of gas is from 2000 to 25000 $nm^3$ per 1 $m^3$ of aluminate solution. The gas is heated in heat exchangers.

Drops of atomized aluminate solution are contacted with heated solid particles of the fluidized bed, to be dried. Thus sodium aluminate is released from the solution to deposit on the surface of the solid particles to enlarge them with the formation of rounded pellets of a size from 0.5 to 8 mm with a bulk weight from 1.2 to 1.4 $t/m^3$. The pellet size depends on the fluidized bed temperature, fluidization velocity, residence time of the solid particles of sodium aluminate in the apparatus, as well as on the atomizing velocity of the aluminate solution. Pelletized sodium aluminate is discharged from the surface of the gas distribution grate. Feeding of the aluminate solution for atomization and discharge of the end product are effected continuously. The resultant product is completely soluble in water and alkaline solutions, has a maximum content of hygroscopic water of 0.3% by weight and a maximum content of water of crystallization of 5% by weight.

The process according to the invention is advantageous compared to the prior art in high output of the equipment, automation of the process and low specific heat consumption. As differed from the multistage crystallization process, wherein, in addition to preliminary evaporation of solutions it is necessary to provide for separation of crystals from the mother liquor, washing of the crystals and recycling of the mother liquor, the process according to the invention is carried out in a single stage.

The process according to the invention can easily be included into the production flow of the alumina manufacture using the Bayer method and the combined Bayer-sintering method.

The invention will be better understood from the following specific examples illustrating the process according to the invention.

EXAMPLE 1

An aluminate solution (wash liquor) from the Bayer process obtained by leaching bauxites and having a concentration of caustic $Na_2O$ of 45 g/l with a molecular ratio of caustic $Na_2O$ to $Al_2O_3$ of 1.6 was evaporated to the content of caustic $Na_2O$ of 350 g/l. The molecular ratio of caustic $Na_2O$ to $Al_2O_3$ remained unchanged. The evaporated solution was fed to a fluidized bed apparatus to be atomized with compressed air using a nozzle at the velocity of 30 m/s. Air at 750° C. was fed to the gas distribution grate in an amount of 2000 $nm^3$ per 1 $m^3$ of the aluminate solution.

The atomized aluminate solution was fed to the surface of the fluidized bed consisting of solid particles of sodium aluminate. The temperature of the fluidized bed material was 250° C. Upon contact of the atomized solution with heated solid particles of the fluidized bed, sodium aluminate released from the solution and deposited to the surface of these particles. Thus, the particles were enlarged and precipitated under gravity to the gas distribution grate to be discharged from the apparatus in the form of pellets. The resultant sodium aluminate had the following composition (in % by weight):

| Caustic Na$_2$O | Al$_2$O | Crystallization H$_2$O |
|---|---|---|
| 47.2 | 48.5 | 4.3 |

The molecular ratio of caustic Na$_2$O to Al$_2$O$_3$ was 1.6.

The sodium aluminate had the following grading (in % by weight): from 0.5 to 1 mm—10, from 1 to 3 mm—85, from 3 to 8 mm—5. Bulk weight was 1.2 t/m$^3$, content of hygroscopic water—0.3% by weight. Solubility in water and alkaline solutions was 100%.

EXAMPLE 2

Sodium aluminate in the form of pellets was produced as described in Example 1. The difference consisted in that sodium aluminate solution was used without preliminary evaporation and had a concentration of caustic Na$_2$O of 260 g/l with a molecular ratio of caustic Na$_2$O to Al$_2$O$_3$ of 1.1. Flow rate of the air fed to the gas distribution grate was 4700 nm$^3$ per 1 m$^3$ of the aluminate solution, air temperature was 900° C. The velocity of atomization of the aluminate solution was 33 m/s.

The resultant sodium aluminate had the following composition (in % by weight):

| Caustic Na$_2$O | Al$_2$O$_3$ | Crystallization H$_2$O |
|---|---|---|
| 38.4 | 57.3 | 4.3. |

The molecular ratio of caustic Na$_2$O to Al$_2$O$_3$ was 1.1.

The sodium aluminate had the following grading (in % by weight):from 0.5 to 1 mm—10, from 1 to 3 mm—90. Bulk weight was 1.3 t/m$^3$, the product contained no hygroscopic water. Solubility in water and alkaline solutions was 100%.

EXAMPLE 3

An aluminate solution obtained by leaching bauxites in the manufacture of alumina by the Bayer method, which had a concentration of caustic Na$_2$O of 160 g/l with a molecular ratio of Na$_2$O to Al$_2$O$_3$ of 1.8 was evaporated to a content of caustic Na$_2$O of 280 g/l. The molecular ratio of caustic Na$_2$O to Al$_2$O$_3$ remained unchanged. The concentrated solution was atomized at the velocity of 35 m/s by means of a mechanically driven nozzle to the surface of a fluidized bed consisting of solid particles of sodium aluminate at 300° C. Nitrogen at 850° C. was used as the fluidizing medium and heat carrier. The flow rate of nitrogen was 5000 nm$^3$ per 1 m$^3$ of the aluminate solution.

The resultant sodium aluminate had the following composition (in % by weight):

| Caustic Na$_2$O | Al$_2$O | Crystallization H$_2$O |
|---|---|---|
| 49.0 | 46.0 | 5.0 |

The molecular ratio of caustic Na$_2$O to Al$_2$O$_3$ was 1.8.

The sodium aluminate had the following grading (in % by weight): from 1 to 3 mm—93, from 3 to 8 mm—7. Bulk weight was 1.2 t/m$^3$, content of hygroscopic water—0.1% by weight. Solubility in water and alkaline solutions was 100%.

EXAMPLE 4

An aluminate solution (wash liquor) obtained from the combined Bayer sintering process in the manufacture of alumina by leaching cakes (the cakes were obtained by sintering bauxites with sodium and calcium carbonates at 1250° C.) was used. The aluminate solution had a concentration of caustic Na$_2$O of 45 g/l with a molecular ratio of caustic Na$_2$O to Al$_2$O$_3$ of 1.3. The aluminate solution was fed to a fluidized bed apparatus for atomization with a mechanically driven nozzle at the velocity of 25 m/s. Air was fed to the gas distribution grate in an amount of 25000 nm$^3$ per 1 m$^3$ of the aluminate solution. The air temperature was 950° C., the temperature of the fluidized bed material was 400° C.

The resultant sodium aluminate had the following composition (in % by weight):

| Caustic Na$_2$O | Al$_2$O$_3$ | Crystallization H$_2$O |
|---|---|---|
| 42.0 | 53.1 | 4.9 |

The molecular ratio of caustic Na$_2$O to Al$_2$O$_3$ was 1.3.

The sodium aluminate had the following grading (in % by weight): from 0.5 to 1 mm—75, from 1 to 3 mm—25. Bulk weight was 1.4 t/m$^3$, content of hygroscopic water in sodium aluminate was 0.05% by weight. Solubility in water and alkaline solutions was 100%.

EXAMPLE 5

An aluminate solution obtained by dissolving aluminum hydroxide in an aqueous solution of sodium hydroxide at 100° C. was used. The aluminate solution had a concentration of caustic Na$_2$O of 100 g/l and molecular ratio of caustic Na$_2$O to Al$_2$O$_3$ of 1.3. The aluminate solution was fed to a fluidized bed apparatus to be atomized with compressed air by means of a nozzle at the velocity of 27 m/s. Air at 930° C. was fed to the gas distribution grate in an amount of 10000 nm$^3$ per 1 m$^3$ of the aluminate solution. The temperature of the fluidized bed material was 380° C.

The resultant sodium aluminate had the same composition as that described in Example 4, with the grading (in % by weight) being as follows: from 0.5 to 1 mm—70, from 1 to 3 mm—30. Bulk weight was 1.35 t/m$^3$, content of hygroscopic water in the sodium aluminate was 0.05% by weight. Solubility in water and alkaline solutions was 100%.

We claim:

1. A process for the production of sodium aluminate comprising drying an unstabilized solution of sodium aluminate containing from 45 to 350 g/l of caustic Na$_2$O at a molecular ratio of caustic Na$_2$O to Al$_2$O$_3$ from 1.1 to 1.8 in a fluidized bed of solid particles of sodium aluminate, at a temperature of from 250° to 400° C., using a gas heated up to 750°-950° C. and containing no carbon dioxide as a fluidizing medium and a heat carrier in an amount from 2000 to 25000 nm$^3$ per 1 m$^3$ of aluminate solution; feeding said aluminate solution for drying by atomizing it at a velocity of from 25 to 35 m/s thereby obtaining sodium aluminate in the form of pellets having a size of from 0.5 to 8 mm with a bulk weight of from 1.2 to 1.4 t/m$^3$, completely soluble in water and alkaline solutions, with a maximum content of hygroscopic water of 0.3% by weight and a maximum content of water of crystallization of 5% by weight.

2. The process as claimed in claim 1 which comprises drying a sodium aluminate solution containing from 250 to 280 g/l of caustic $Na_2O$ at a molecular ratio of caustic $Na_2O$ to $Al_2O_3$ of from 1.1 to 1.3, said solution being prepared by leaching bauxites or by leaching cakes resulting from sintering bauxites with sodium and calcium carbonates at 1200° to 1300° C.

3. The process as claimed in claim 1, wherein an aluminate solution with a concentration of caustic $Na_2O$ of from 45 to 180 g/l is dehydrated up to a concentration of caustic $Na_2O$ of from 250 to 350 g/l prior to drying.

* * * * *